M. G. DE SIMONE.
COFFEE MAKING MACHINE.
APPLICATION FILED JAN. 20, 1912.

1,063,188.

Patented June 3, 1913.

2 SHEETS—SHEET 1.

M. G. DE SIMONE.
COFFEE MAKING MACHINE.
APPLICATION FILED JAN. 20, 1912.

1,063,188.

Patented June 3, 1913.

2 SHEETS—SHEET 2.

WITNESSES:
Fred White
William H. Martin

INVENTOR:
Michele Guglielmo de Simone,
By Attorneys,
Fraser Link Meyer

UNITED STATES PATENT OFFICE.

MICHELE GUGLIELMO DE SIMONE, OF NEW YORK, N. Y., ASSIGNOR TO ANGELO C. SCAVULLO, OF NEW YORK, N. Y.

COFFEE-MAKING MACHINE.

1,063,188.  Specification of Letters Patent.  Patented June 3, 1913.

Application filed January 20, 1912. Serial No. 672,511.

*To all whom it may concern:*

Be it known that I, MICHELE GUGLIELMO DE SIMONE, a subject of the King of Italy, residing in the borough of Manhattan, city, county, and State of New York, have invented certain new and useful Improvements in Coffee-Making Machines, of which the following is a specification.

This invention relates to coffee making machinery and has for its object to provide an apparatus which will receive raw coffee berries and preferably deliver a decoction of coffee ready for drinking. Preferably the several operations of roasting, grinding, infusing, etc., are duly arranged in time according to the quantity and quality of the coffee to be treated.

The machine provided by the invention in its preferred form comprises a roaster, a distiller, a grinder, and an infusing device, which are adapted to roast the coffee, to collect from the roasted coffee the vapors which are given off, to grind the roasted coffee, and to prepare the coffee decoction ready for drinking. Preferably a boiler for water is provided and means for leading the boiling water to the ground coffee, and preferably also the products of the distiller are turned into the decoction either directly or through the body of ground coffee being treated. Preferably also the above-named devices are controlled successively and automatically in their several operations.

The accompanying drawings illustrate one construction of apparatus made in accordance with this invention.

Figure 1:
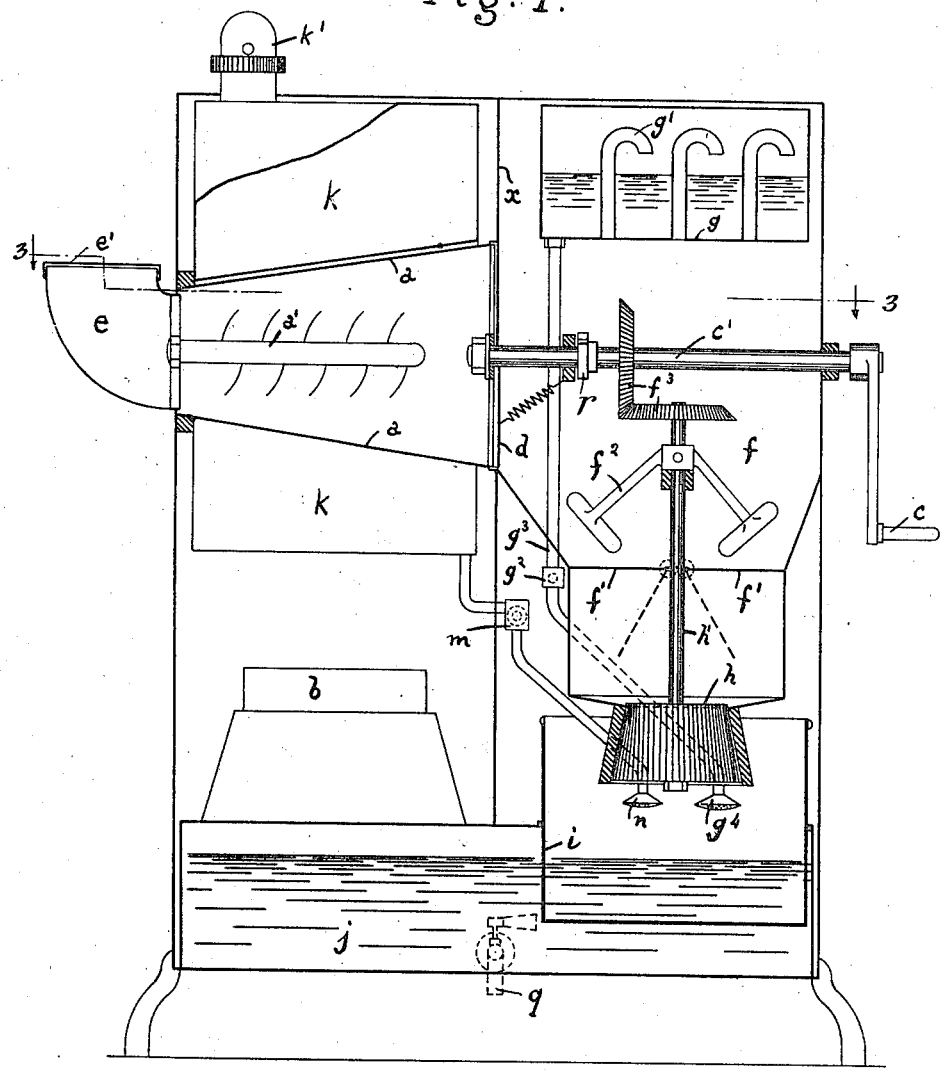
Figure 4:
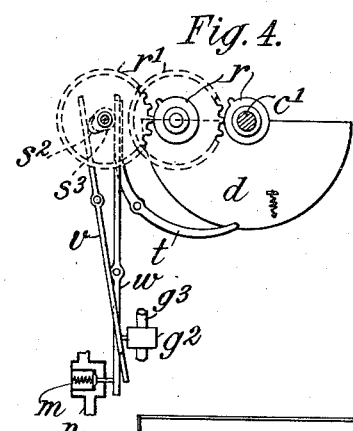
Figure 5:
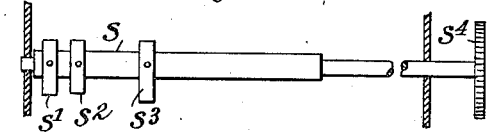
Figure 3:
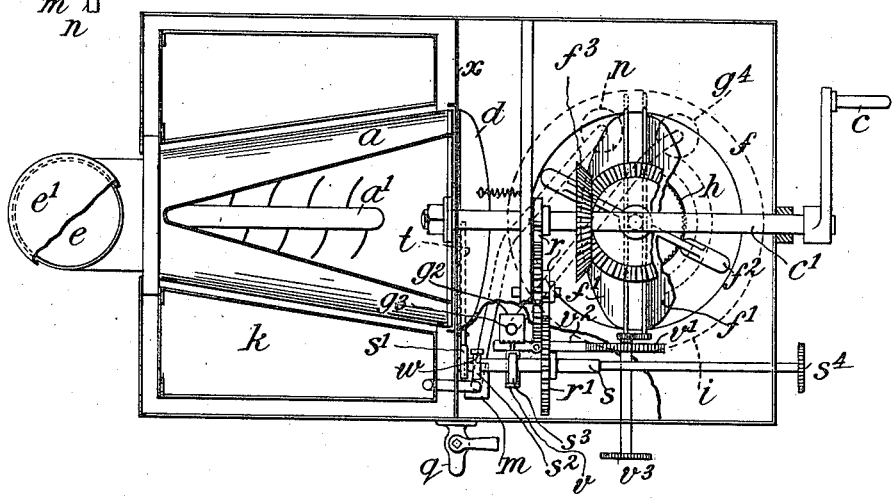
Figure 2:
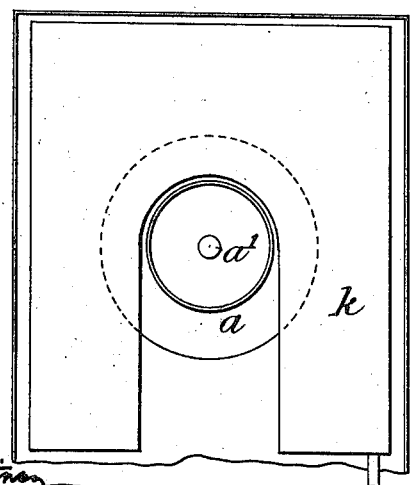

Figure 1 is a sectional elevation. Fig. 2 is a part side view of Fig. 1, looking from the left. Fig. 3 is a horizontal section on the line 3—3 Fig. 1. Fig. 4 is a diagrammatic view showing the connection and operation of the controlling mechanism. Fig. 5 is a plan view of a detail of the timing mechanism.

$a$ is a conical roasting chamber heated by a lamp $b$. It is to be understood that any form of heating device may be employed according to the size of the apparatus. The roaster $a$ is provided with a stationary agitator $a'$ and the roaster is adapted to be rotated by a shaft $c'$ operated by a handle, an electric motor or other means. The shaft $c'$ is connected to the larger and innermost end of the roaster which is closed by means of a spring door $d$, the outer end of the roaster is provided with a curved hopper $e$ with a covering cap $e'$ adapted to be tightly closed when the roaster has been filled with berries. The roaster is preferably proportioned to receive a definite quantity of berries whereby the amount to be dealt with in the apparatus is determined, it being only necessary to fill up the roaster. When the coffee is roasted it is delivered through the door $d$ to the distiller $f$ where it rests upon flaps $f'$ disposed above the grinder $h$. An agitator $f^2$ is driven from the shaft $c'$ by bevel wheels $f^3$. This agitator is adapted to stir up the roasted berries, the vapors from which pass upward into the condenser $g$ by means of the bent tubes $g'$ which direct the vapors on to the top of the water disposed in the condenser whereby the said vapors will be condensed and combined with the water in the condenser.

After a certain period the flaps $f'$ are depressed to dotted position and the berries fall into the grinder $h$ which is of any suitable kind and is driven by a shaft $h'$ which is a continuation of the agitator shaft. From the grinder $h$ the ground coffee falls into a strainer $i$ which is disposed at a suitable level in the tank $j$.

$k$ is a boiler which surrounds the roaster above the lamp $b$. The boiler is preferably closed by a safety valve as at $k'$ adapted to keep the boiler at such a pressure that the water when used for making the coffee will exceed the ordinary temperature at which water boils at atmospheric pressure. From the boiler the water is led through a controlling valve $m$ to a sprayer $n$ disposed above the strainer $i$ into which the ground coffee is delivered. A similar valve controlled pipe $g^3$ delivers the essence or liquor from the condenser $g$ through another sprayer $q^4$.

$q$ is a tap by which the coffee is drawn off into cups as required.

Referring now to the controlling mechanism which is shown most clearly in Figs. 3, 4 and 5 of the apparatus, this mechanism may be disposed at the side or adjacent to the central partition $x$ of the apparatus. The shaft $c'$ is connected through suitable gearing consisting of single toothed wheels $r$ $r$ and intermediate toothed wheels $r'$ $r'$ with a cam shaft $s$ upon which are mounted three cams $s'$ $s^2$ $s^3$. Two of these cams $s^2$ $s^3$ are fixed in definite relation to the cam shaft and the cam $s'$ is adjustable in relation to the shaft by means of an external disk $s^4$. The cam $s'$ controls a lever $t$ which normally holds the spring pressed door $d$ of the roaster closed. The cam $s^2$ controls a lever $v$ which serves to lock and release the flaps $f'$ $f'$ by means of a toothed wheel and pawl $v'$ $v^2$. The flaps $f'$ $f'$ are returned to position by an external disk $v^3$. The same lever $v$ may control a valve $g^2$ in the pipe $g^3$ which permits liquor to flow from the condenser to the rose $g^4$ which operates a spring pressed valve $m$.

A cam $s^3$ operates a lever $w$ which moves inwardly a spring-pressed valve $m$ which allows water to pass from the boiler to the spraying rose $n$.

In operation the lamp $b$ being lighted the required quantity of coffee berries are placed in the roaster $a$ through the hopper $e$ which is then closed. The handle $c$ is rotated which rotates the roaster $a$ and also the shaft $c'$ of the timing mechanism. As soon as the shaft $c'$ has been sufficiently rotated the cam $s'$ operates the lever $t$ and the door $d$ opens by its spring and the roasted berries pass out on to the flaps $f'$ $f'$. Here they rest and are stirred by the agitator $f^2$. This part of the apparatus constitutes the distiller and the vapors from the roasted berries rise and pass into the condenser $g$ through the bent pipes $g'$ where the vapors are condensed and deposited in the water and form a liquor containing these essences of the berries which would otherwise be lost. The continued movement of the handle brings the cam $s^2$ after the required period into such position that the lever $v$ and pawls $v^2$ release the ratchet $v'$ and the flaps $f'$ $f'$ drop by gravity or spring action and the coffee berries fall into the grinder $h$ where they are ground by the continued movement of the handle $c$. The ground coffee falling into the strainer $i$ at or about the same time that the lever $v$ releases the valve $g^2$ and the liquor from the condenser is discharged into the ground coffee as it accumulates. At or about the time when this operation is complete the cam $s^8$ operates the lever $w$ and opens the boiler valve $m$ and the hot water from the boiler is discharged through the rose $n$ on to the coffee in the strainer $i$ and into the tank or receiver $j$ by which operation the preparation of the coffee is complete and the same can be drawn off by the tap $q$ from the receiver $j$ into cups or otherwise as required. As soon as the boiler is discharged another controlling device connected to the handle may release a gravity or spring actuated extinguisher which puts out the lamp. The flaps $f'$ $f'$ will be restored to closed position by the disk $v^3$ and the door $d$ closed when the apparatus will be again ready for use. The timing of the apparatus may be regulated by adjusting the position of the cam $s'$, a suitable external indicator being provided showing the right position for a given quantity of coffee.

It is to be understood that other equivalent arrangements of controlling and timing mechanism may be substituted for that described and shown, and also that an electric motor may be substituted for the handle and the apparatus will be otherwise modified in shape according to dimensions and the amount of coffee to be treated at one time.

While I have shown and described the preferred form of apparatus, it will be understood that various parts thereof may be utilized without departing from the invention.

What I claim is:—

1. A coffee making machine comprising means for roasting the coffee, means for distilling the essences from the roasted coffee, means for grinding the coffee, and an infusion device which is adapted to receive the distillate and ground coffee.

2. A coffee making machine comprising a roasting device, a distilling device, means for transferring the coffee from the roaster to the distilling device, a grinding device, means for transferring the coffee to the grinding device from the distilling device, an infusion device, and means for transferring the ground coffee to the infusion device.

3. A coffee making machine comprising a roasting device, a distilling device, means for transferring the coffee from the roaster to the distilling device, a grinding device, means for transferring the coffee to the grinding device from the distilling device, an infusion device, means for transferring the ground coffee to the infusion device, and mechanism for controlling the operation of the above devices.

4. A coffee making machine comprising a roaster, a distilling device, means for agitating the roasted berries in said distilling device, means for collecting the essences therefrom, a grinding device, means for transferring the berries from the distilling device to the grinding device, an infusion device adapted to receive the ground coffee, and means for transferring the essences to said infusion device.

5. A coffee making machine comprising a roaster, a boiler for water, a distilling device adapted to receive the essences from the roasted coffee, a grinding device, an infusion device, means for transferring water from said boiler to said infusion device, and means for transferring the essences from the distilling device.

6. A coffee making machine having a roaster, a distilling device, a grinding device, an infusion device, a boiler, mechanism for controlling the passage of the coffee through said devices, and means adapted to control the outlets from said various devices.

In witness whereof, I have hereunto signed my name in the presence of two subscribing witnesses.

MICHELE GUGLIELMO DE SIMONE.

Witnesses:
EUGENE V. MYERS,
THOMAS F. WALLACE.